July 11, 1933.  A. E. FOHN  1,917,363
CABINET
Filed July 15, 1931
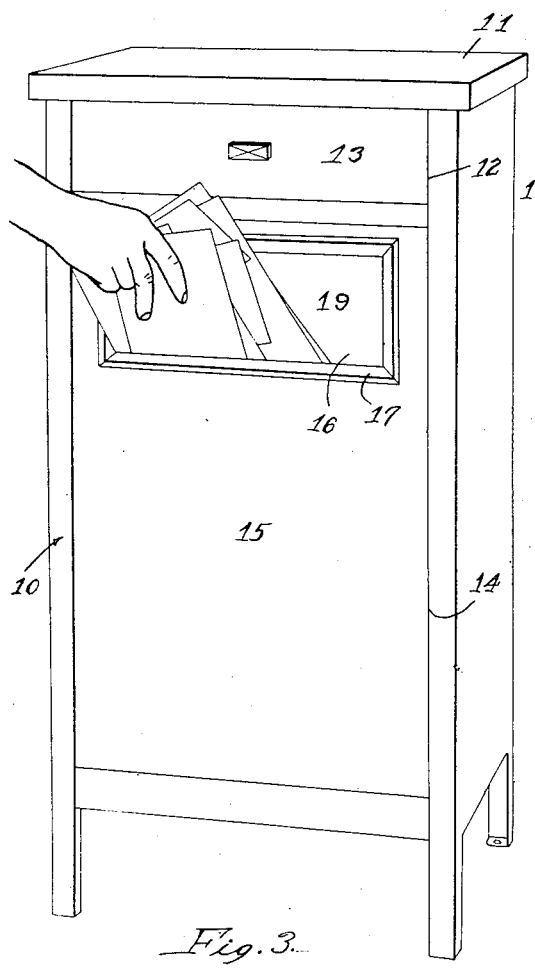
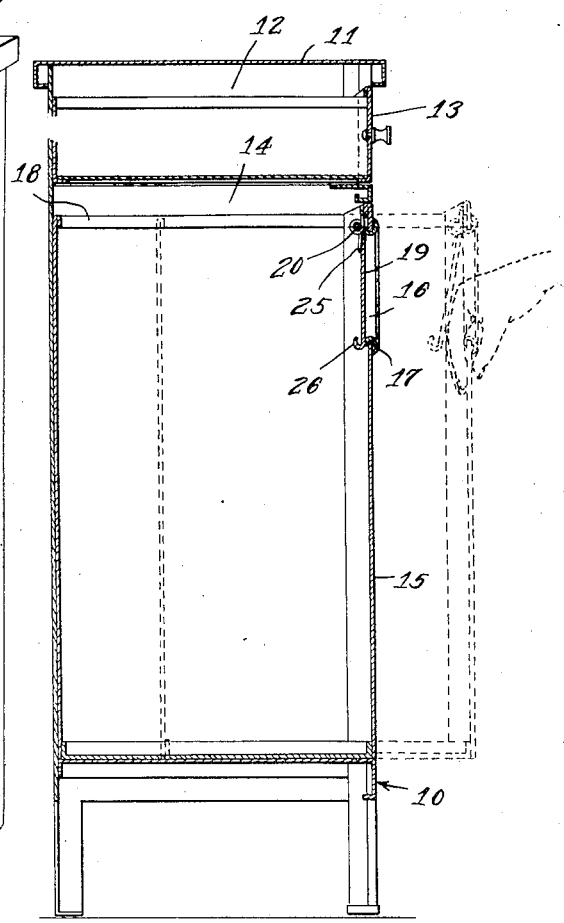
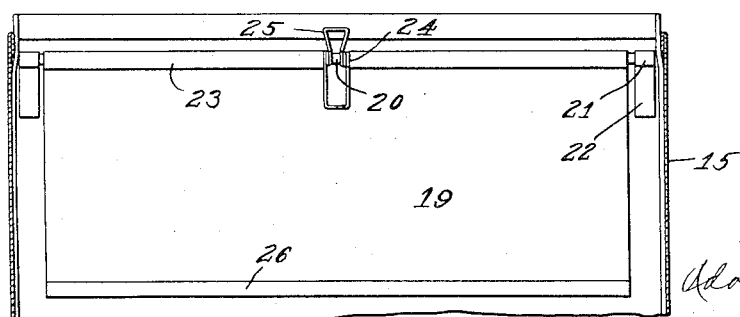

Patented July 11, 1933

1,917,363

UNITED STATES PATENT OFFICE

ADOLPH E. FOHN, OF AURORA, ILLINOIS, ASSIGNOR TO AURORA METAL CABINET CO., OF AURORA, ILLINOIS, A CORPORATION OF ILLINOIS

CABINET

Application filed July 15, 1931. Serial No. 550,832.

This invention relates to an article of office furniture, namely, a combination telephone stand and waste paper cabinet.

The principal object of my invention is to provide a cabinet of desk height so as to be suitable for use alongside an office desk to serve as a telephone stand, and having a fireproof compartment therein occupied by a waste paper receptacle into which waste paper is arranged to be thrown through a spring-closed trap door on the front thereof, and at a convenient elevation with respect to the desk top. This eliminates the fire hazard of the open exposed waste basket into which lighted matches or cigarettes are apt to be thrown carelessly, and also avoids the unsightliness of a filled waste basket with scraps of paper littering the floor thereabout. The receptacle is arranged to be slid out of the cabinet for emptying.

The invention is illustrated in the accompanying drawing, in which—

Figure 1 is a perspective view of the cabinet, indicating how waste paper is arranged to be thrown into the receptacle therein;

Fig. 2 is a central vertical section through the cabinet, showing in dotted lines how the waste paper receptacle is arranged to be slid out, and Fig. 3 is an inside view of the trap door on said receptacle.

The same reference numerals are applied to corresponding parts throughout the views.

The cabinet 10 is of sheet metal construction throughout for lightness, cheapness, and serviceability, but principally to be fire-resistant. The cabinet is made of the same height as the average office desk, so that the top 11 can be used conveniently as a telephone stand. A compartment is suitably provided directly below the top 11, as indicated at 12, for a drawer 13 in which the telephone directory and any other incidental articles may be placed for convenient accessibility. A large compartment 14 is provided in the cabinet below the drawer 13 for the waste paper receptacle 15. The drawer 13 and receptacle 15 are, of course, both of sheet metal construction and have the fronts thereof finished to match the cabinet. Now, the receptacle 15 is made to fit neatly in the compartment 14, so that it may be slid into and out of the cabinet easily, but still not allow enough air to enter the compartment 14 when the receptacle is slid all the way in to support combustion. In other words, the cabinet 10 cooperates with the receptacle 15 to form a substantially air-tight container for waste paper. Thus, any fire starting therein through any cause is practically certain of smothering. A blaze resulting from the burning of paper in the receptacle 15 is confined entirely within the walls of the sheet metal cabinet so that anything, however, closely adjacent to the cabinet, is absolutely protected.

The receptacle 15 has a waste paper opening 16 in the front wall thereof suitably defined by an ornamental sheet metal frame 17, the said opening being as near the open top 18 of the receptacle as possible so as to be within convenient reach for a person seated at an adjacent desk, and so that one can continue to drop paper through the opening until the receptacle is practically filled. A trap door 19, made of sheet metal, is provided as a closure for the opening 16 inside the receptacle 15, the same being carried on a rod 20 which fits at its opposite ends in bearings 21 formed on the upper ends of sheet metal straps 22 spot-welded or otherwise suitably secured onto the inside of the front wall of the receptacle. The upper edge of the piece of sheet metal, of which the door 19 is formed, is bent around the rod 20 and suitably fixed thereto, as indicated at 23, but a gap is left at the middle, as indicated at 24, for a double-coiled grasshopper type spring 25, which has its coils received on the rod 20 and its one end abutting the inside of the front wall of the receptacle and its other end abutting the inside of the door 19, whereby normally to hold the door closed. The lower edge of the piece of sheet metal of which the door 19 is formed is rolled, as indicated at 26, so as not to present any sharp edges on which one might get fingers cut or scratched when using the waste paper opening 16 as a hand hole, as indicated in the dotted line showing in Fig. 2, in pulling out the receptacle and emptying the same. The frame 17 affords a good place to take hold of the receptacle in pulling it out or replacing it, as well as in dumping the contents. The frame also affords the desired reinforcement for the front wall about the opening, so that there is no danger of its buckling or bending out of shape by handling. The trap door 19 is, therefore, always assured of a good straight abutment so as properly to seal the opening 16.

In the use of the cabinet of my invention, the trap door 19 is arranged to open easily to permit waste paper to be thrown into the receptacle through the opening 16 in the manner indicated in Figure 1. While the spring 25 is light enough to permit easy opening of the door, it is, nevertheless, strong enough to keep the door normally closed tightly, so as to make the unit fireproof. The receptacle should always be pushed all the way in so as to keep the compartment 14 substantially air-tight for fire protection. As indicated above, the opening 16 serves not only as a waste paper opening, but also as a hand hole for use when the receptacle is removed and replaced for emptying.

It should be understood that while reference is made only to use of the cabinet for storage of waste paper, it could be and has been used for other purposes. For example, in hospitals and doctors' offices, cabinets of this kind are used for soiled towels, or bandages, etc. Beauty parlors and barber shops also find cabinets of this kind useful for soiled towels. In the home a cabinet of the present type is useful as a receptacle for soiled linens. The claims should be construed accordingly.

I claim:

1. A fireproof waste paper cabinet comprising a metal cabinet provided with a compartment opening at the front of the cabinet, an open top metal receptacle for waste paper slidable into and out of the cabinet compartment and having one of the vertical walls thereof constructed to serve as a closure for the compartment whereby to provide a substantially air-tight waste paper receptacle when the same is disposed in the cabinet, the aforesaid wall having a waste paper opening provided therein, and a closure for said opening.

2. A device of the character described comprising a cabinet having a compartment therein reaching substantially the full height thereof and open at the front, an open top receptacle slidable horizontally into and out of said compartment, one of the vertical walls of said receptacle being constructed to serve as a closure for the open front of said compartment, said wall having an opening provided therein at the upper end thereof, and a closure for said opening.

3. A device of the character described comprising a cabinet having a compartment therein reaching substantially the full height thereof and open at the front, an open top receptacle slidable horizontally into and out of said compartment, one of the vertical walls of said receptacle being constructed to serve as a closure for the open front of said compartment, said wall having an opening provided therein at the upper end thereof, and a trap door for closing said opening from the inside of the receptacle, the same being hinged at the top of the opening to swing inwardly, and serving normally to keep the opening closed.

4. A device of the character described comprising a cabinet having a compartment therein reaching substantially the full height thereof and open at the front, an open top receptacle slidable horizontally into and out of said compartment, one of the vertical walls of said receptacle being constructed to serve as a closure for the open front of said compartment, said wall having an opening provided therein at the upper end thereof, a trap door for closing said opening from the inside of the receptacle, the same being hinged at the top of the opening to swing inwardly, and spring means for normally urging the door to closed position.

5. In a fireproof waste paper cabinet, an open top drawer-like waste paper receptacle arranged to be slidable into and out of a cabinet compartment, said receptacle having an opening in the front wall thereof at the top through which waste paper is arranged to be thrown into the receptacle when the same is placed in a cabinet, said opening being arranged to serve as a hand hole for use in removing the receptacle from a cabinet or replacing the same therein, whereby to eliminate the necessity for a separate handle, and a trap door for closing said opening from the inside of the receptacle, the same being pivoted to swing inwardly.

6. In a fireproof waste paper cabinet, an open top drawer-like waste paper receptacle arranged to be slidable into and out of a cabinet compartment, said receptacle having an opening in the front wall thereof at the top through which waste paper is arranged to be thrown into the receptacle when the same is placed in a cabinet, said opening being arranged to serve as a hand hole for use in removing the receptacle from a cabinet or replacing the same therein, whereby to eliminate the necessity for a separate handle, a trap door for closing said opening from the inside of the receptacle, the same being pivoted to swing inwardly, and spring means normally urging the door toward closed position, said spring means being of light tension to permit easy opening of the door to admit waste paper and also permit use of the opening as a hand hole.

7. An article of sheet metal furniture of the character described comprising a sheet metal cabinet having a compartment therein open at the front thereof, an open top sheet metal receptacle slidable into and out of said compartment like a drawer, the front wall of said sheet metal receptacle being constructed to serve as a closure for the compartment whereby to make the same substantially air-tight for fire protection, said wall having an opening provided therein near the top, a sheet metal frame defining said opening and serving to reinforce the wall about the opening to prevent buckling of said wall in the handling of said receptacle, said opening being adapted to serve as a hand hole for use in removing and replacing the receptacle and emptying the same, said opening normally serving otherwise as a waste paper opening, and a sheet metal trap door for closing said opening from the inside of the receptacle, the same being hinged at the top thereof and being arranged normally to swing downwardly to a position closing the opening.

8. In an article of sheet metal furniture of the character described, the combination of a cabinet open only at the front thereof, the same being suitably of desk height so that the top thereof is adapted to serve as a telephone stand, a sheet metal drawer below the top serving to define the top of a fireproof compartment for a waste paper receptacle, and an open top sheet metal receptacle fitting in said compartment and slidable into and out of the cabinet like a drawer, said receptacle having an opening in the front wall near the top, and a sheet metal trap door closing said opening from the inside of the receptacle, the same being mounted to swing inwardly whereby to permit dropping of waste paper through said opening into the receptacle.

9. In an article of sheet metal furniture for office use, the combination of an upright cabinet of sheet metal, fire resisting construction, the same providing therein a compartment for storage purposes substantially the full height of said cabinet, the cabinet being suitably of desk height so that the top thereof is adapted to serve as a telephone support and so that the storage space therein is correspondingly increased, an open top sheet metal receptacle of a size to fill said compartment, the same being movable into and out of said compartment to permit emptying, and an inwardly swingable closure for an opening communicating with the upper end of said receptacle, the same tending normally to move to closed position to seal said compartment.

10. In an article of office furniture of the character described, the combination of an upright cabinet suitably of desk height whereby the same is adapted to serve as a telephone stand, a telephone support forming the top of said cabinet, said cabinet providing therein a storage compartment for waste paper substantially the full height thereof, an inwardly swingable, normally closed, trap door on the front of said cabinet close to the top thereof and communicating with the upper end of the storage compartment whereby to permit dropping waste paper into the cabinet, and a removable receptacle fitting closely inside said compartment to receive the articles thrown therein.

In witness of the foregoing I affix my signature.

ADOLPH E. FOHN.